United States Patent
Kyosti et al.

(10) Patent No.: US 10,601,695 B2
(45) Date of Patent: Mar. 24, 2020

(54) SYSTEMS AND METHODS FOR RADIO CHANNEL EMULATION OF A MULTIPLE INPUT MULTIPLE OUTPUT (MIMO) WIRELESS LINK

(71) Applicant: KEYSIGHT TECHNOLOGIES, INC., Santa Rosa, CA (US)

(72) Inventors: Pekka Kyosti, Host (FI); Jukka Kyrolainen, Oulu (FI)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/254,414

(22) Filed: Sep. 1, 2016

(65) Prior Publication Data
US 2018/0062971 A1    Mar. 1, 2018

(51) Int. Cl.
*H04L 12/26* (2006.01)
*H04B 7/0413* (2017.01)
*H04L 12/933* (2013.01)

(52) U.S. Cl.
CPC .......... *H04L 43/50* (2013.01); *H04L 43/12* (2013.01); *H04B 7/0413* (2013.01); *H04L 49/101* (2013.01)

(58) Field of Classification Search
CPC ....... H04L 43/50; H04L 43/12; H04L 49/101; H04B 7/0413; H04B 17/309; H04B 17/373; H04B 17/0042; H04B 17/002; H04W 24/06; H04W 24/00; G01R 29/105
USPC .......................................... 455/67.11, 67.12
See application file for complete search history.

(56) References Cited

U.S. PATENT DOCUMENTS

| | | | |
|---|---|---|---|
| 5,463,317 A | 10/1995 | Murphy | |
| 5,892,482 A * | 4/1999 | Coleman, Jr. | H01Q 1/52 343/700 MS |
| 8,718,122 B2 * | 5/2014 | Griesing | H04W 24/00 375/224 |

(Continued)

FOREIGN PATENT DOCUMENTS

| | | | | |
|---|---|---|---|---|
| WO | WO-2011148030 A1 * | 12/2011 | | H01Q 21/20 |
| WO | WO-2013169324 A1 * | 11/2013 | | H04B 7/0413 |

OTHER PUBLICATIONS

Yu et al., "Radiated Two-Stage Method for LTE MIMO User Equipment Performance Evaluation," IEEE Transactions on Electromagnetic Compatibility, vol. 56, Dec. 2014, pp. 1691-1696 (Year: 2014).*

(Continued)

*Primary Examiner* — Un C Cho
*Assistant Examiner* — Lalita W Pace

(57) ABSTRACT

Systems and methods for testing a wireless device under test (DUT) using over the air (OTA) channel emulation are disclosed herein. According to an aspect, a system is disclosed for testing a wireless DUT having a DUT antenna array. The system includes a probe antenna array, a shielded test chamber, a radio channel emulator, and a wireless communication emulator. The probe antenna array is electrically coupled with the radio channel emulator, and the shielded test chamber is configured to position the DUT antenna array in a radiative near field region of the plurality of probe antennas. The wireless communication emulator is operatively coupled with the radio channel emulator and is configured to emulate an electrical coupling between at least one antenna port of the DUT and at least one radio channel model of the radio channel emulator.

7 Claims, 5 Drawing Sheets

(56) References Cited

U.S. PATENT DOCUMENTS

| | | |
|---|---|---|
| 9,742,508 B1 | 8/2017 | Kyosti et al. |
| 2006/0229018 A1* | 10/2006 | Mlinarsky ............ H04B 7/0413 455/67.11 |
| 2006/0229020 A1* | 10/2006 | Mlinarsky ............ H04B 17/391 455/67.14 |
| 2007/0243826 A1 | 10/2007 | Liu |
| 2007/0243836 A1 | 10/2007 | Cabrera et al. |
| 2008/0114580 A1* | 5/2008 | Chin ................... H04B 7/0682 703/13 |
| 2011/0084887 A1* | 4/2011 | Mow ..................... G01R 29/10 343/703 |
| 2011/0200084 A1* | 8/2011 | Griesing ................ H01Q 3/267 375/224 |
| 2011/0299570 A1* | 12/2011 | Reed ................... H04B 7/0434 375/130 |
| 2012/0275506 A1 | 11/2012 | Ding et al. |
| 2012/0309323 A1* | 12/2012 | Guo ................... H04B 17/0087 455/67.14 |
| 2013/0027256 A1* | 1/2013 | Guo ................... H04L 41/0823 343/703 |
| 2014/0024318 A1 | 1/2014 | Sevindik et al. |
| 2014/0141728 A1* | 5/2014 | Devarasetty ........... H04B 17/18 455/67.14 |
| 2015/0017928 A1* | 1/2015 | Griesing ............ H04B 17/0085 455/67.14 |
| 2016/0212641 A1 | 7/2016 | Kong et al. |
| 2016/0233970 A1 | 8/2016 | Reed |
| 2016/0285572 A1 | 9/2016 | Manghal et al. |
| 2016/0344490 A1 | 11/2016 | Foegelle |
| 2017/0184698 A1 | 6/2017 | Rueth |
| 2017/0207843 A1 | 7/2017 | Jung et al. |
| 2018/0041936 A1 | 2/2018 | Kim et al. |
| 2018/0048399 A1* | 2/2018 | Thiruvarankan .... H04B 17/103 |
| 2019/0190624 A1 | 6/2019 | Kyosti et al. |

OTHER PUBLICATIONS

Oh et al., "Antenna Measurement Method in Fresnel Region by φ-Variation Scanning", IEEE Antennas and Wireless Propagation Letters, vol. 7, 2008, pp. 206-209 (Year: 2008).*

Yu, Wei; "Radiated Two-Stage Method for LTE MIMO User Equipment Performance Evaluation"; IEEE Transactions on Electromagnetic Compatibility, vol. 56, No. 6, Dec. 2014.

Restriction Requirement dated Aug. 29, 2018, U.S. Appl. No. 15/844,044, 6 pgs.

Non-Final Office Action dated Dec. 13, 2018, for U.S. Appl. No. 15/844,044, 10 pgs.

Final Office Action dated Apr. 12, 2019, for U.S. Appl. No. 15/844,044, 18 pgs.

Advisory Action dated Jun. 17, 2019, from U.S. Appl. No. 15/844,044, 2 pges.

Notice of Allowance dated May 23, 2018, U.S. Appl. No. 15/721,757, 20 pgs.

Notice of Allowance dated Jul. 30, 2019, U.S. Appl. No. 15/844,044, 9 pgs.

* cited by examiner

SYSTEMS AND METHODS FOR RADIO CHANNEL EMULATION OF A MULTIPLE INPUT MULTIPLE OUTPUT (MIMO) WIRELESS LINK

TECHNICAL FIELD

The presently disclosed subject matter relates to radio channel emulation. Particularly, the presently disclosed subject matter relates to systems and techniques for testing wireless devices using over the air (OTA) radio channel emulation.

BACKGROUND

Wireless devices can be tested either in real environments or by using a radio channel emulator (also called a fading emulator or a radio channel simulator). Radio channel models are provided to the radio channel emulator to simulate the real environments. Since tests performed in real environments are typically cumbersome and subject to uncontrollable phenomena, the radio channel emulator is a preferred solution. The radio channel emulator can emulate many radio channel dimensions including the spatio-polarimetric. Antenna characteristics of the wireless device may also be modeled. A radio channel emulator can include a finite impulse response (FIR) filter, which generates convolution between a radio channel model and an applied signal. The FIR filter includes a series of delays, multipliers, and adders to modify the applied signal and provide a simulated output signal representative of a real environment. The radio channel model may be adapted to represent different real environments by modifying the series of delays and coefficients associated with the multipliers. One method of using the radio channel emulator requires direct coupling to the antenna ports of the wireless device with coax cables.

However, some wireless devices to not have available coax connections between their antennas and antenna ports. Additionally, with cellular wireless communications the cell sizes are getting smaller and the utilized bands are getting higher in frequency. This trend will continue with the coming 5G cellular systems. Base stations will be smaller and include more integrated units. Both base station vendors and their antenna manufacturers have indicated that the coming smaller base stations may not have coax connections for their antennas. When the coax connections are not available, a multi-probe anechoic chamber (MPAC) may be required. However, MPACs are expensive and require large floor areas. A typical wireless device such as a Long Term Evolution (LTE) base station or LTE wireless user equipment (UE) may require an MPAC utilizing over 100 square meters of floor space.

For at least the aforementioned reasons, there is a need for improved methods for alleviating the need of an MPAC or direct coax cable coupling to antenna ports of a wireless device-under-test (DUT).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods for testing a wireless DUT using OTA channel emulation are disclosed herein. According to an aspect, a system is disclosed for testing a wireless DUT having a DUT antenna array. The system includes a probe antenna array, a shielded test chamber, a radio channel emulator, and a wireless communication emulator. The probe antenna array is electrically coupled with the radio channel emulator, and the shielded test chamber is configured to position the DUT antenna array in a radiative near field region of the probe antenna array. The wireless communication emulator is operatively coupled with the radio channel emulator and is configured to emulate an electrical coupling between at least one antenna port of the DUT and at least one radio channel model of the radio channel emulator.

In another aspect, the DUT antenna array may be configured as a multiple-input and multiple-output (MIMO) antenna array. The system may also include a crossbar switch electrically coupled between the probe antenna array and the radio channel emulator. A processor may be coupled with the crossbar switch, the radio channel emulator, and the wireless communication emulator. The wireless communication emulator may include a plurality of MIMO antenna ports electrically coupled with the radio channel emulator.

In another aspect, the crossbar switch may be configured to electrically couple at least one probe antenna with the radio channel emulator, and the at least one probe antenna may be configured to wirelessly couple with at least one DUT antenna. The radio channel emulator may also be configured to measure characteristic transfer data between the at least one DUT antenna and the at least one probe antenna at the test frequency. The processor may be configured to modify antenna data using the characteristic transfer data. A performance characteristic of the DUT may be suitably measured by a communications tester or other suitable equipment using the modified antenna data and predetermined radio channel data.

In another aspect, the predetermined radio channel data may represent a multipath fading channel model for the DUT. Each probe antenna may be a linearly polarized patch antenna having two co-located orthogonally polarized antenna elements. The DUT may be a wireless base station and the wireless communication emulator may be a wireless user equipment (UE) emulator. In another aspect, the DUT may be a wireless user equipment (UE) device and the wireless communication emulator may be wireless base station emulator.

In another aspect, the DUT may be one of a standard base station, a picocell, a femtocell, a microcell, a wireless local area network (WLAN) access point, a smart phone, a smart watch, a smart TV, a tablet, a laptop, and a vehicle.

In another aspect, a method for operating a system to test a wireless DUT having a DUT antenna array is disclosed. The system includes a shielded test chamber having a probe antenna array electrically coupled with a radio channel emulator. The shielded test chamber is configured to position the DUT antenna array in a radiative near field region of the probe antenna array. The method includes:
- wirelessly coupling the at least one probe antenna with at least one DUT antenna;
- using the radio channel emulator to measure characteristic transfer data between the at least one DUT antenna and the at least one probe antenna at the test frequency;
- using a processor to determine modified antenna data using the characteristic transfer data;
- using the modified antenna data to emulate an electrical coupling between at least one antenna port of the DUT and at least one radio channel model of the radio channel emulator; and using a communications tester to measure a performance characteristic of the DUT based on the modified antenna data and predetermined radio channel data.

In another aspect, the test frequency may be at least one of approximately one of 2.6 gigahertz (GHz) and 28 GHz.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices.

One technique for testing a wireless DUT without coax antenna connections is digital baseband emulation wherein a radio channel model is inserted at a baseband interface. This technique is similar to the direct coupling technique. However, there are not wide industry supported standards or agreements on digital baseband emulation. Another technique is the "two-stage OTA test method" promoted by Keysight Technologies (formerly Agilent Technologies). The first stage includes measuring the DUT radiation pattern in an MPAC. The second stage includes measuring a static N×N transfer function from N probe antennas to N DUT antennas. The inverse of the N×N transfer function is multiplied with a radio channel model. The performance of the wireless DUT can be measured without direct coax coupling using the radio channel model and the N×N transfer function. This technique is further described by Wei Yu; Yihong Qi; Kefeng Liu; Yangguang Xu; Jun Fan, *Radiated Two-Stage Method for LTE MIMO User Equipment Performance Evaluation*" in IEEE Transactions on Electromagnetic Compatibility, Year: 2014, Volume: 56, Issue: 6, Pages: 1691-1696, DOI: 10.1109/TEMC.2014.2320779, the subject matter of which is hereby incorporated by reference. However, this technique requires at least a one-time usage of a large test chamber for each DUT type.

The following described embodiments relate to testing a wireless DUT using OTA radio channel emulation. The techniques avoiding using direct coupling of coax cables and improve on the "two-stage OTA test method" by not requiring the use of an MPAC. Specifically, the techniques use a relatively small shielded test chamber and are antenna agnostic to the DUT.

Figure 1:
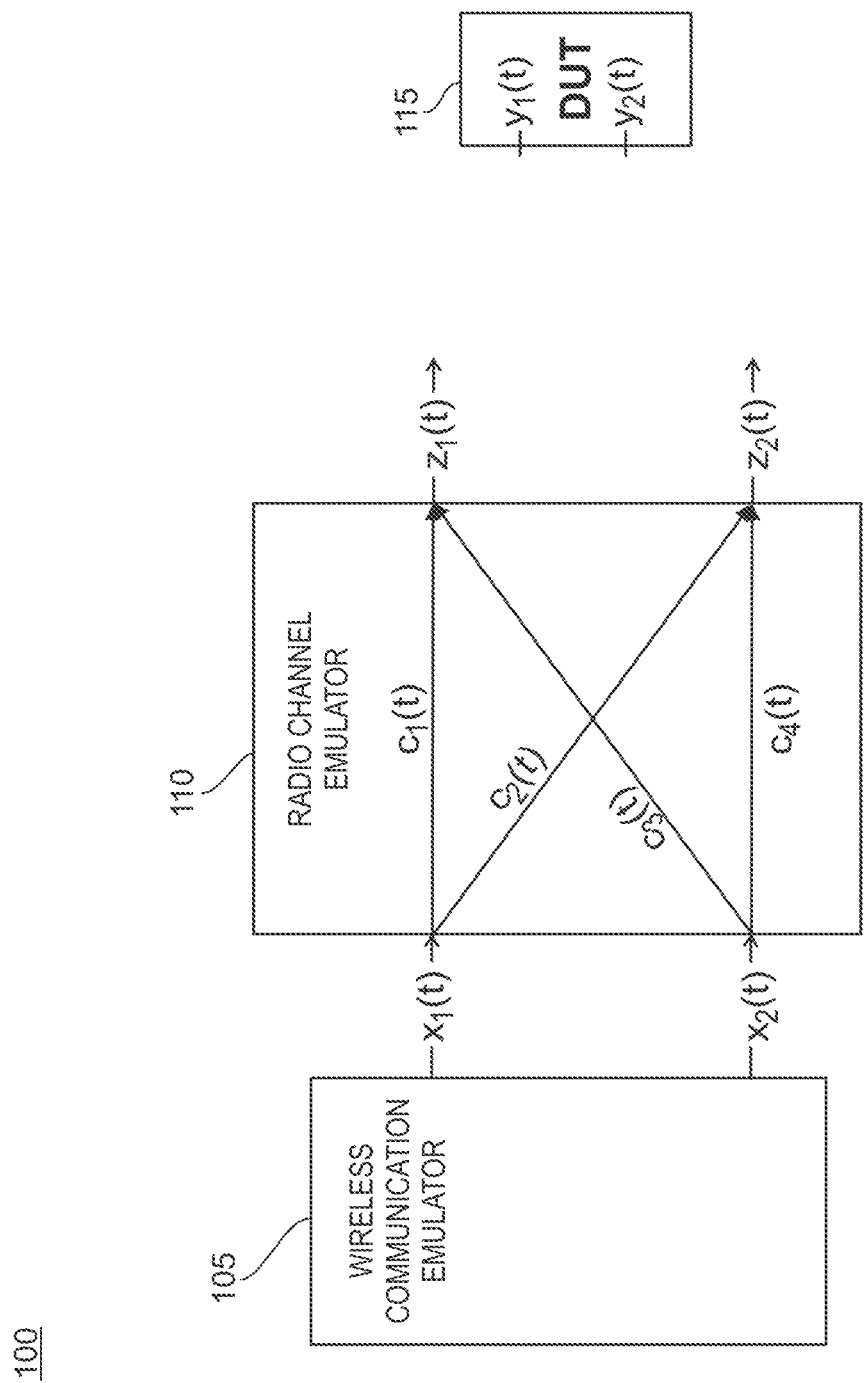
FIG. 1 is a block diagram of a simple 2×2 MIMO configuration including a wireless communication emulator, a radio channel emulator and a DUT in accordance with embodiments of the present disclosure.

FIG. 1 illustrates a simple block diagram 100 of a 2×2 MIMO configuration including a wireless communication emulator 105 electrically coupled with a radio channel emulator 110 using MIMO antenna ports $x_1(t)$ and $x_2(t)$. The radio channel emulator 110 provides MIMO antennas $z_1(t)$ and $z_2(t)$ to wirelessly couple to a a DUT 115 having a DUT antenna array including MIMO antennas $y_1(t)$ and $y_2(t)$ of a DUT 115. Propagation paths $c_1(t)$, $c_2(t)$, $c_3(t)$, and $c_4(t)$ may be modeled by the radio channel emulator 110. The DUT 115 may be a wireless base station and the wireless communication emulator 105 may be a wireless UE emulator. In other embodiments, the DUT 115 may be a wireless UE device and the wireless communication emulator 105 may be wireless base station emulator.

Figure 2:
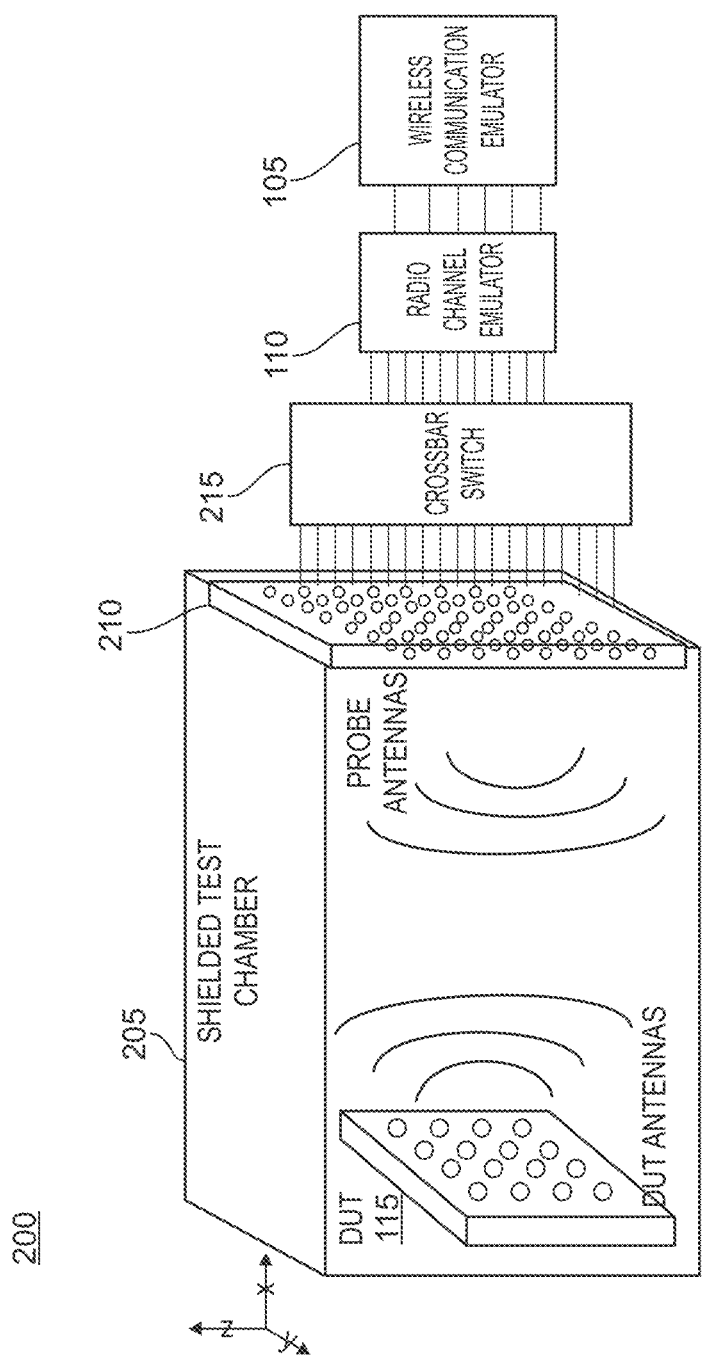
FIG. 2 is a block diagram a system including a shielded test chamber for testing a DUT using OTA radio channel emulation in accordance with embodiments of the present disclosure.

FIG. 2 illustrates a block diagram of a system 200 for testing a DUT 115 using OTA radio channel emulation in accordance with embodiments of the present disclosure. The DUT 115 may be a wireless base station. In other embodiments the DUT 115 may be a wireless UE device. In other embodiments, the DUT 115 may be one of a standard base station, a picocell, a femtocell, a microcell, a wireless local area network (WLAN) access point, a smart phone, a smart watch, a smart TV, a tablet, a laptop, and a vehicle.

The system 200 includes a shielded test chamber 205 having a probe antenna array 210. The shielded test chamber 205 may have a radio frequency (RF) absorbing material coated on the inside. However, a complete reduction of RF reflections may not be required. Each probe antenna may be a linearly polarized patch antenna having two co-located orthogonally polarized antenna elements. The DUT 115 has a DUT antenna array and the DUT is positioned in the shielded test chamber 205 such that the DUT antenna array is located in a radiative near field region (i.e. Fresnel region) of the probe antenna array 210. The DUT antenna array should not be placed in the non-radiative (i.e. reactive region) of the probe antenna array 210. The DUT antenna array may be configured as a MIMO antenna array. In other embodiments, only the DUT antenna array portion of the DUT 115 may be positioned in the shielded test chamber 205. Other portions of the DUT 115 may be positioned outside the shielded test chamber 205 and electrically coupled with the DUT antenna array through a chamber portal.

The system 200 also includes a crossbar switch 215 (e.g. a coax matrix switch) electrically coupled with the probe antenna array 210. A radio channel emulator 110 is electrically coupled with the crossbar switch 215 and a wireless communication emulator 105 is operatively coupled with the radio channel emulator 110. The wireless communication emulator 105 may be a wireless UE emulator. In other embodiments, the wireless communication emulator 105 may be a wireless base station emulator. The wireless communication emulator 105 may include a plurality of MIMO antenna ports providing the coupling with the radio channel emulator 110. The crossbar switch 215 may be configured to electrically couple one or more probe antennas with the radio channel emulator 110. A processor (not shown in FIG. 2) may be coupled with the crossbar switch 215, the radio channel emulator 110, and the wireless communication emulator 105. The system 200 may be configured to emulate an electrical coupling (i.e. a wireless cable) between at least one antenna port of the DUT 115 and at least one radio channel model of the radio channel emulator 110.

The radio channel emulator 110 may be configured to measure characteristic transfer data between one or more DUT antennas and one or more probe antennas at a test frequency. The test frequency may be between 450 megahertz (MHz) and 80 GHz. In other embodiments the test frequency may be at least one of approximately 2.6 GHz or 28 GHz. The radio channel emulator 110 may be configured to receive known pilot signals from the DUT 115 when measuring the characteristic transfer data. The known pilot signals may comprise an LTE reference signal or another dedicated test mode signal of the DUT 115. In other embodiments, the radio channel emulator 110 may include a multiport vector network analyzer (VNA) and the VNA may be configured to measure characteristic transfer data.

The processor may be configured to modify antenna data of the probe antenna array 210 using the characteristic transfer data. A communications tester and/or other components may be further configured to measure a performance characteristic of the DUT 115 using the modified antenna data and predetermined radio channel data. The performance characteristic may be measured in a propagation direction from the wireless communication emulator 105 to the DUT 115, or from the DUT 115 to the wireless communication emulator 105. The predetermined radio channel data may represent a multipath fading channel model for the DUT 115. The multipath fading channel model may be a standardized channel model as described by COST, IEEE, ITU, 3GPP or other relevant standards organizations. The multipath fading channel model may include one or more profiles. A profile may be for a "typical urban", a "rural area", or a "hilly domain" as defined by the given standards organization.

Figure 3:
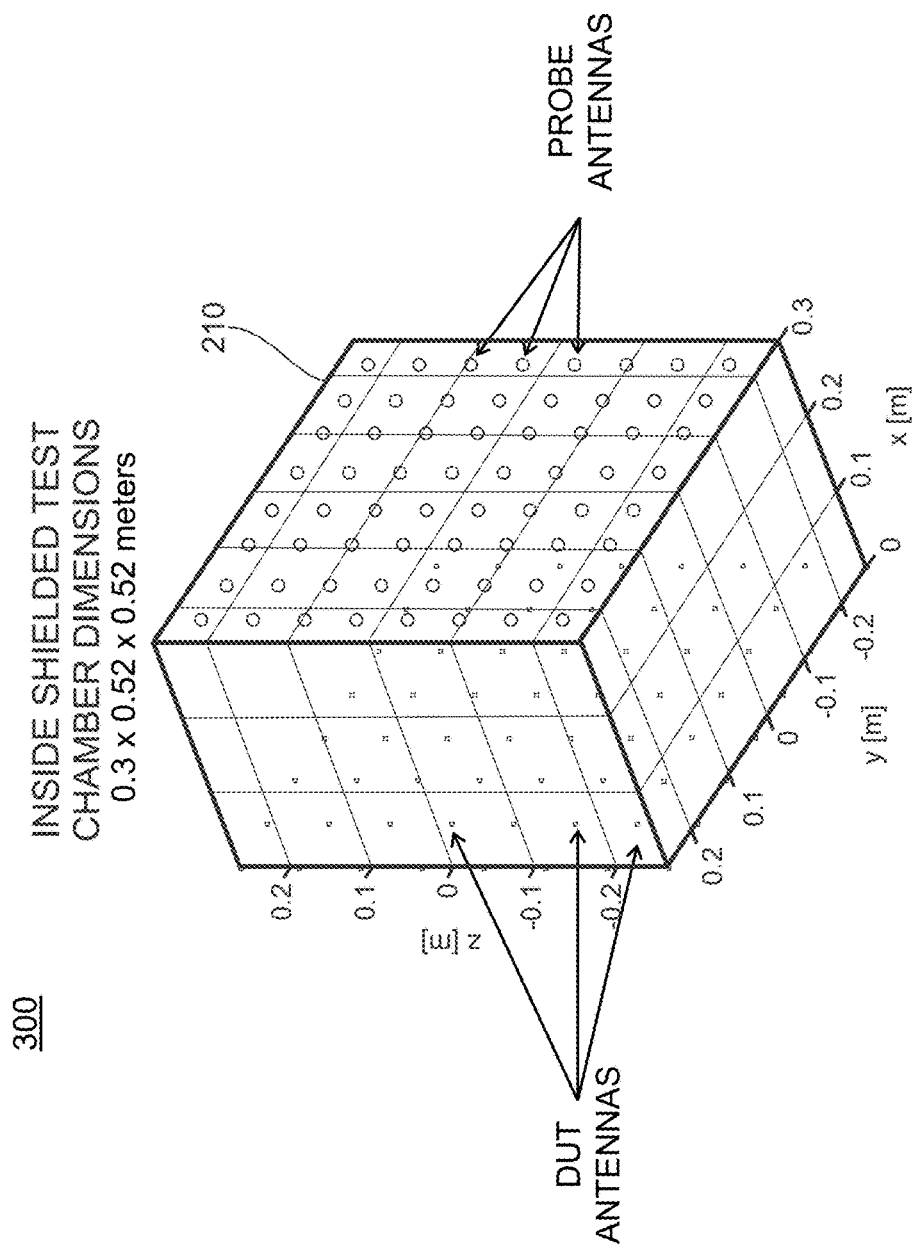
FIG. 3 is diagram of the inside of the shielded test chamber including dimensions in accordance with embodiments of the present disclosure.

FIG. 3 illustrates a diagram 300 of the inside of the shielded test chamber 205 including DUT antennas of the DUT antenna array and probe antennas of the probe antenna array 210 in accordance with embodiments of the present disclosure. The DUT antenna array is configured as an 8×8 antenna array and the probe antenna array 210 is configured as an 8×8 antenna array. The probe antenna array 210 uses linearly polarized patch antennas. Inside dimensions of the shielded test chamber 205 are approximately 0.3×0.52×0.52 meters for a test frequency of approximately 2.6 GHz. An additional 0.2 meters may be reserved for the RF absorbing material coated on the inside the shielded test chamber 205. This brings the overall the dimensions of the shielded test chamber 205 to 0.7×0.92×0.92 meters or approximately 0.6 cubic meters. For higher test frequencies the dimensions may be substantially reduced. As such the probe antenna may be placed in a radiative near field region (i.e. Fresnel region) of DUT antenna array. In other embodiments, the dimensions may be expanded to allow the DUT antenna array to be placed within a far field region of the probe antenna array 210 allowing higher power levels to be accommodated.

The probe antennas may be configured on a regular grid with an approximate spacing of 0.5 wavelengths of the test frequency in vertical and horizontal dimensions. Each probe antenna may be electrically coupled to the crossbar switch 215. The crossbar switch 215 may be configured to simultaneously connect M probe antennas to M antenna ports of the radio channel emulator 110. To emulate large frequency ranges, multiple probe antenna arrays configured for different frequency bands may be used. However, the DUT antenna array must be positioned an appropriate distance from the probe antenna array 210 based on the test frequency.

Figure 4:
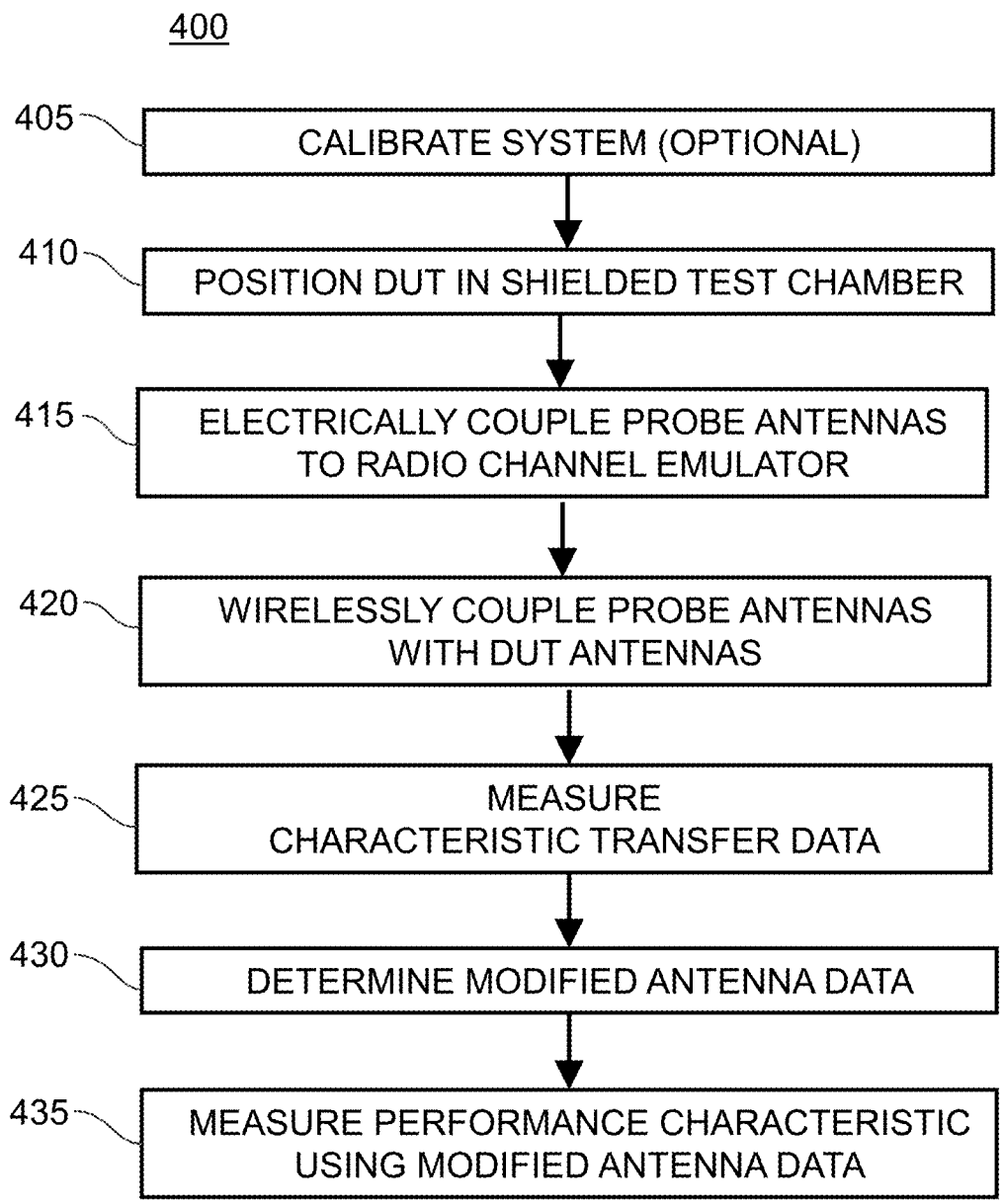
FIG. 4 is a flow chart illustrating a method of testing a DUT using OTA radio channel emulation in accordance with embodiments of the present disclosure.

FIG. 4 illustrates a flow chart of a method 400 for testing a DUT 115 using OTA radio channel emulation of system 200 in accordance with embodiments of the present disclosure.

A step 405 may include calibrating the system 200 and may or may not be performed with each test of a DUT 115. In other embodiments step 405 may be performed as a standard calibration cycle of the system 200. The step 405 is further described later in the application.

A step 410 may include positioning the DUT 115 in the shielded test chamber 205 such that the DUT antenna array having N DUT antennas is configured to be in the radiative near field region of the probe antenna array 210.

Steps 415-430 may be performed to configure the system 200 to emulate one or more electrical couplings (i.e. wireless cables) between one or more antenna ports of the DUT 115 and one or more radio channel models of the radio channel emulator 110.

A step 415 may electrically couple M selected probe antennas with the radio channel emulator 110 using the crossbar switch 215. The M number of selected probe antennas preferably equals the N number of DUT antennas. Each M selected probe antenna may be determined to best match in position with each N DUT antenna.

A step 425 may measure characteristic transfer data between DUT antennas and M selected probe antennas. The characteristic transfer data may include complex transfer functions from N DUT antennas to M selected probe antennas. Each complex transfer function may be represented as an N×M transfer matrix F. The transfer matrix F may be time-invariant as long as the conditions within the shielded test chamber 205 remain static and the DUT 115 does not perform any switching within its own RF chains.

The measurement of the characteristic transfer data may be performed by the radio channel emulator 110 either once in the beginning of testing or continuously during the testing of the DUT 115. The measurement may be performed by exploiting known structures of of RF signals transmitted by the DUT 115. The radio channel emulator 110 may downconvert and sample the DUT transmitted RF signals, received by the M selected probe antennas at each of its inputs, perform synchronization and detect and decode necessary information of the RF signal structure to enable characteristic transfer data estimation.

In other embodiments, wherein the DUT 115 is a base station, the characteristic transfer data estimation may be based on similar types of channel estimation algorithms as a typical UE device (e.g. mobile phone) may use in communication with the base station. This is typically based on a known pilot sequence transmitted on each DUT transmit antenna port. The pilot sequences are typically made orthogonal between the different DUT transmit antenna ports, for example by transmitting pilot symbols of each DUT antenna port on non-overlapping time-frequency slots. The full time-frequency characteristic transfer data for each DUT transmit antenna may then be extracted by interpolation. The measurement may be performed at each probe antenna M and estimation of characteristic transfer data may be performed for each DUT antenna N to obtain a full N×M transfer matrix F. Each element (n, m) of transfer matrix responses include the responses of DUT RF-chain and associated antenna, the time-invariant propagation channel between DUT antenna n and probe antenna m and responses of probe antenna m, possible cables and crossbar switch connections between probe antenna m and the radio channel emulator 110, and radio channel emulator input port RF-chain response.

If antenna port specific pilot sequences are not available, the DUT 115 may be configured to transmit a known calibration sequence by each of its DUT antenna ports. The pilot sequences or calibration sequences may be transmitted simultaneously by each DUT antenna port and the reception on each probe antenna port may be performed simultaneously. Simultaneous transmission and reception enables quick calibration measurements. This measurement method may calibrate out possible imbalances between active antenna system (AAS) RF-chains (i.e. due to non-ideal AAS internal calibration). This may be a preferred test method in some cases. If it is necessary to preserve the possible AAS RF-chain imbalances in the test or to measure the AAS system internal calibration accuracy, then the measured channel transfer matrix data may be further processed to obtain the AAS calibration imbalances as explained in later in step 405.

A step 430 may determine modified antenna data by optimizing complex M×1 weight vector $g_n$ for each DUT antenna n as shown in equation (1).

$$g_n = \begin{cases} F^{-1}T_n, & M = N \\ (F^H F)^{-1} F^H T_n, & M \neq N \end{cases} \quad (1)$$

In equation (1), $T_n$ is an N×1 vector of target values per DUT antenna. Vector Tn has all zero entries, except the nth entry which is 1. Finally M×N weight matrix G may be composed from columns $g_n$.

The weight matrix G may be utilized to compose a beam (i.e. "wireless cable") to each DUT antenna. For example, an impulse response of an original radio channel model may be available for testing assuming direct coupling between each wireless communication emulator antenna port k and each DUT antenna port n in transmit and receive propagation directions. The impulse response may be given by $h_{nk}(t,\tau)$. To emulate direct coupling in the system 200 using the wireless coupling of the DUT antenna array and the probe antenna array, the M output/input ports (i.e. ports coupled with the crossbar switch 215) of the radio channel emulator 110 may be weighted by the $n^{th}$ column of matrix G.

Specifically, the radio channel emulator 110 may be understood as a time variant filter convolving its input signal x(t), (e.g. transmit signal of the wireless communication emulator 105, by channel impulse responses h(t,τ) of the radio channel model and transmitting output y(t). Neglecting noise the system function may be written as shown in equation (2).

$$y_n(t) = \sum_k h_{nk}(t, \tau) * x_k(t) \quad (2)$$

If the delay/frequency domain is neglected for notational simplicity, equation (2) may be written in matrix format as shown in equation (3).

$$Y_{N \times 1}(t) = H_{N \times K}(t) X_{K \times 1}(t) \quad (3)$$

In equation (3), matrix H is the time variant MIMO channel impulse response (CIR) matrix for K transmitters and N receivers and may be fully determined by the radio channel model to be emulated. Equation (3) may represent a fading emulation as would be performed in a conductive manner (i.e. with a coax cable connection). For system 200 the system function may now be changed as shown in equation (4).

$$Y_{N \times 1}(t) = F_{N \times M} G_{M \times N} H_{N \times K}(t) X_{K \times 1}(t) \quad (4)$$

In equation (4), the term GH(t) is the modified CIR matrix to be used by the radio channel emulator 110.

In other embodiments, the weighting may be performed by multiplying the weights to the emulation files of the radio channel emulator 110 and composing a new radio channel model.

A step 435 of FIG. 4 may use the radio channel emulator 110 with the modified antenna data, predetermined radio channel data, and the selected probe antennas of the probe antenna array 210 to measure performance characteristics of the DUT 115. The predetermined radio channel data may represent a multipath fading channel model for the DUT 115. The multipath fading channel model may be a standardized channel model as described by COST, IEEE, ITU, 3GPP or other relevant standards organizations. The multipath fading channel model may include one or more profiles. A profile may be for a "typical urban", a "rural area", or a "hilly domain" as defined by the given standards organization.

An important aspect of the method 400 is that individual DUT antenna characteristics may not be known by the system 200. Alternatively, the DUT (active) antenna characteristics may be either partially or fully included in the performance testing of the DUT 115 when calibration measurements of DUT chain responses are performed as part of step 405. The partial inclusion of antenna characteristics may be based on utilizing samples of each DUT antenna main boresight direction (i.e. axis of maximum antenna gain). The full inclusion is possible if radiation patterns of DUT antenna elements are known. In this case, the normalized radiation patterns are embedded in the radio channel model in addition to the calibration of DUT chain responses as described in step 405.

Another important aspect in testing a DUT 115 with an AAS is measurement of AAS calibration accuracy. A typical DUT 115 with multiple RF-integrated antennas performs calibration of RF-chains to compensate phase and amplitude differences between the RF-chains and/or individual DUT antennas of the DUT antenna array. The calibration may be performed periodically on certain intervals or constantly during operation. The system 200 and method 400 described in this disclosure may allow for measurement of AAS calibration accuracy. The measurement of calibration errors may be necessary in a product development phase and a quality assurance program of the DUT 115. Also, depending on the AAS calibration method, it may be necessary for "factory calibration" to fine tune the parameters for the DUT 115 AAS internal calibration method.

When calibration of system 200 is required and step 405 is performed, the DUT chain (i.e. DUT antenna element plus RF-chain) imbalances may be measured. The probe antenna chain (i.e. probe antenna, cables and crossbar switch connection, and radio channel emulator input RF-chain) imbalances may be first calibrated in order to measure DUT chain imbalances. The probe antenna radiation patterns of the system 200 may be assumed to be known and the responses of possible coax cables, the crossbar switch 215 and RF-chains of the radio channel emulator input ports may be calibrated prior to DUT antenna measurement by measuring responses of the probe antenna chains by transmitting calibration test signals from a known location in the shielded test chamber 205. The calibration test signal may either be transmitted by a separate calibration antenna, or by a DUT transmitted signal of one of the DUT antennas, which may be positioned to the known location. The calculation of calibration coefficients of probe antenna chains may be straightforward as the geometry of the probe antenna setup and probe antenna radiation patterns are known. Once the probe antenna chain responses are calibrated, the DUT chain imbalances may be measured. The N×1 calibration response vector K is composed of complex field strength samples of each DUT antenna n, which may be sampled in a yz-plane at x coordinate location of probe antennas exactly opposite to DUT antenna n (i.e. exactly same y,z coordinates where DUT antenna n is placed. The exact location of a DUT antenna element in the test chamber may not be known and may be estimated by determining the maximum field strength and/or zero derivative of the phase pattern within a grid of the M probe element field strength samples. The probe antennas may not be placed on exactly the same y,z positions as DUT antennas. Therefore the grid of M field strength samples may need to be interpolated to a finer grid to find appropriate approximation of DUT antenna y,z position and thus the calibration response vector elements $k_n$.

Alternatively, the y,z positions of DUT antenna elements may be estimated by performing angle of arrival (AoA) estimation based on M probe antenna complex field strength samples and calculating the exact distance based on known probe antenna locations and known distances between the DUT antenna array and the probe antenna array 210. Measurement by the dual-polarized (i.e. orthogonally polarized) probe antennas may allow accurate measurement of DUT antenna polarization characteristics, and the calibration measurement of each DUT antenna may be based on co-polarization field samples of the given DUT antenna.

The complex field strength samples of calibration response vector K may include the information of phase and amplitude imbalances between the DUT chains. A N×1 vector U of relative phase and amplitude differences (i.e. imbalances) between the DUT chains may be calculated by taking one DUT chain as reference and calculating the differences of calibration response vector K elements of each the DUT chain compared to the reference DUT chain such as elements $u_n$ of vector U (i.e. complex coefficients) as calculated in equation (5).

$$u_n = \frac{k_{ref}}{k_n} \quad (5)$$

The DUT chain imbalances (i.e. DUT AAS calibration inaccuracy) may be included in a final performance test measurement by excluding the effects of imbalances from the transfer matrix F as shown in equation (6).

$$F_c = \text{diag}(U)F \quad (6)$$

The previously described steps and related functions for the method 400 of FIG. 4 may be in no absolute chronological order, and some of the steps may be performed simultaneously or in an order differing from one disclosed. Other functions may also be executed between the steps or within the steps. Some of the steps may also be left out or replaced with a corresponding step.

Figure 5:
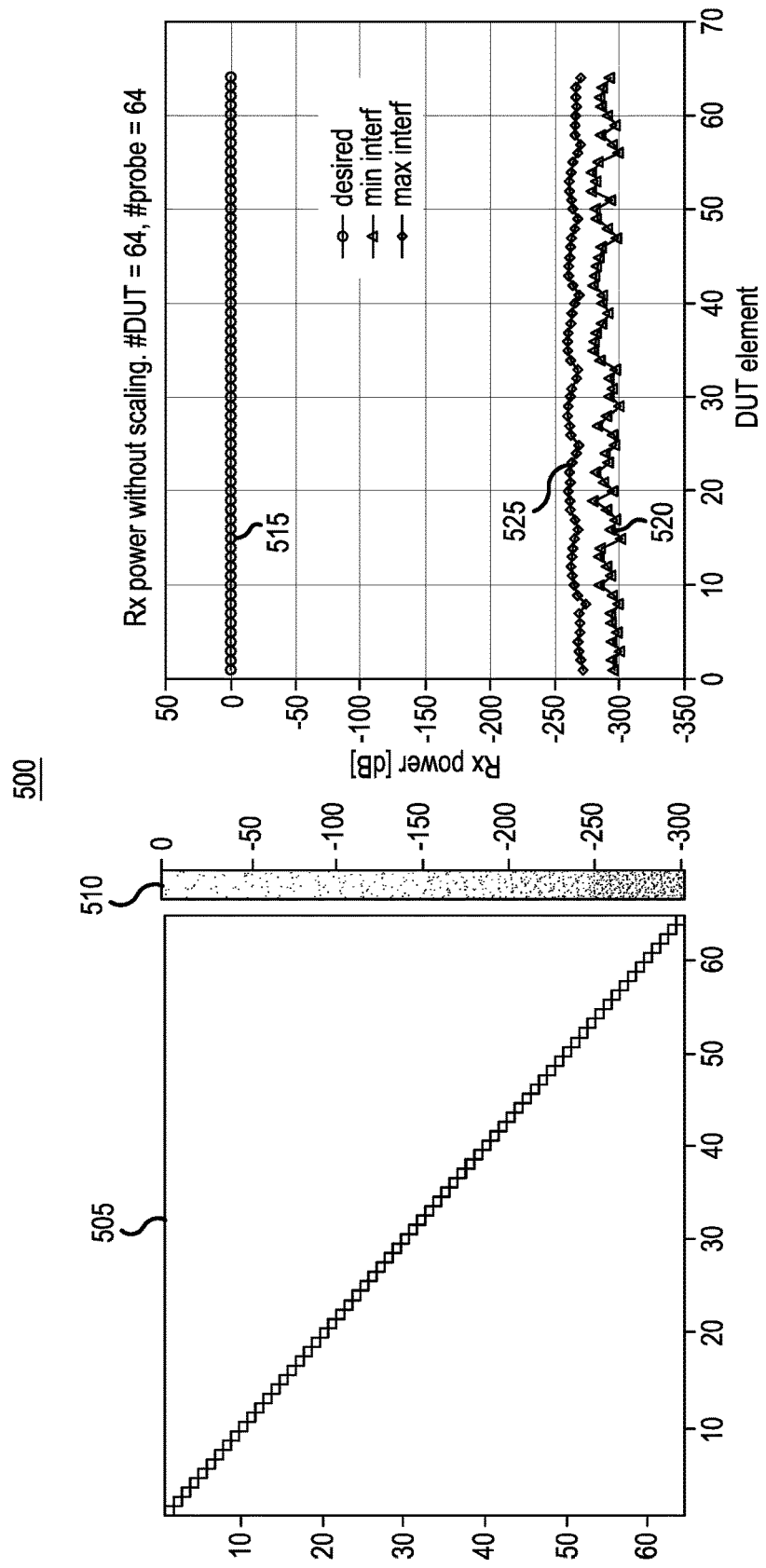
FIG. 5 illustrates graphs representing DUT antenna port coupling and isolation using the shielded test chamber with the dimensions of FIG. 3 in accordance with embodiments of the present disclosure.

FIG. 5 illustrates graphs 505, 515, 520, and 525 representing emulated DUT antenna port coupling and isolation using the shielded test chamber 205 with the example inside dimensions of FIG. 3 and the test frequency of 2.6 GHz in accordance with embodiments of the present disclosure. The graph 505 depicts power levels at the emulated electrical couplings of the DUT antenna array as determined by the radio channel emulator 110. The diagonal elements of graph 505 indicate the relative received power of the desired connection and the off diagonal elements indicate the relative received (Rx) power of non-desired (interfering) connections. The first column refers to the case with a first DUT antenna as the desired connection, wherein the purpose is to compose a wireless cable to the first DUT antenna. The top most element indicates 0 dB Rx power and the remaining 63 elements indicate below −250 dB relative Rx power by the other 63 DUT antennas. A graph key 510 is used for graph 505 to identify the relative Rx signal power level at each DUT antenna coupling of graph 505 between 0 decibels (dB) and −300 dB.

Graphs 515, 520, and 525 represent another view to the graph 505. As depicted, the system 200 and method 400 emulate a DUT antenna port coupling that achieves a desired relative Rx power of approximately 0 dB (i.e. graph 515) while isolation to other DUT antenna ports is at least −250 dB under minimum (i.e. graph 520) and maximum (i.e. graph 525) interference conditions. However, if the number of selected probe antennas is less than the number of DUT antennas then the isolation to other DUT antenna ports may become much worse. In this case the degrees of freedom offered by probe antennas may not sufficient.

In other embodiments, the processor described with system 200 of FIG. 1 may be capable of performing one or more of the steps of FIG. 4. The processor may be implemented as an electronic digital computer and may include random access memory (RAM) and a central processing unit (CPU). At least a portion of the circuitry of FIG. 1 may be controlled by a sequence of program instructions transferred to the CPU from the RAM. The CPU may contain a number of microinstructions for basic operations. The implementation of microinstructions may vary depending on the CPU design. Depending on the processing power needed, the program instructions may be executed on multiple processors. The program instructions may be coded by a programming language, which may be a high-level programming language, such as C, C++, Java, etc., or a low-level programming language, such as a machine language, or an assembler. The processor may also have an operating system, which may provide system services to the processor.

In other embodiments the sequence of program instructions may be embodied on a distribution medium. The program instructions may be in source code form, object code form, or in some intermediate form. The distribution medium may be any entity or device capable of carrying the program instructions. Such carriers include a record medium, computer memory, read-only memory, and a software distribution package, for example.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Therefore, the embodiments disclosed should not be limited to any single embodiment, but rather should be construed in breadth and scope in accordance with the appended claims.

What is claimed is:

1. A system for testing a wireless device under test (DUT), comprising:
    a DUT antenna array configured as a multiple-input and multiple-output (MIMO) antenna array;
    a probe antenna array electrically coupled with a radio channel emulator, wherein the DUT antenna array is located in a Fresnel region of the probe antenna array;
    a shielded test chamber configured to position the probe antenna array in a radiative near field region of the DUT antenna array;
    a wireless communication emulator operatively coupled with the radio channel emulator, wherein the radio channel emulator is configured to emulate an electrical coupling between at least one antenna port of the DUT and at least one radio channel model of the radio channel emulator, and to measure characteristic transfer data between the at least one DUT antenna of the DUT antenna array and at least one probe antenna of the probe antenna array at a test frequency;
    a crossbar switch configured to connect simultaneously a plurality (M) of probe antennas to a plurality (M) antenna ports of the radio channel emulator; and
    a processor coupled with the crossbar switch, the radio channel emulator, and the wireless communication emulator, the processor being configured to modify antenna data using characteristic transfer data, wherein the plurality (M) antenna ports of the radio channel emulator is a plurality of MIMO antenna ports electrically coupled with the radio channel emulator.

2. The system of claim 1, wherein:
    at least one probe antenna of the probe antenna array is configured to wirelessly couple with at least one DUT antenna of the DUT antenna array; and
    wherein the system further comprises a communication tester configured to measure a performance characteristic of the DUT using the modified antenna data and predetermined radio channel data.

3. The system of claim 2, wherein the predetermined radio channel data represents a multipath fading channel model for the DUT.

4. The system of claim 3, wherein each probe antenna of the probe antenna array is a linearly polarized patch antenna having two co-located orthogonally polarized antenna elements.

5. The system of claim 1, wherein the DUT is a wireless base station and the wireless communication emulator is a wireless user equipment (UE) emulator.

6. The system of dam 1, wherein the DUT is a wireless user equipment (UE) device and the wireless communication emulator is a wireless base station emulator.

7. The system of claim 1, wherein the DUT is one of a standard base station, a picocell, a femtocell, a microcell, a wireless local area network (WLAN) access point, a smart phone, a smart watch, a smart TV, a tablet, a laptop, and a vehicle.

* * * * *